UNITED STATES PATENT OFFICE 2,279,256

ADHESIVE COMPOSITION

Jacob G. Mark, Cambridge, Mass., assignor to Dewey and Almy Chemical Company, North Cambridge, Mass., a corporation of Massachusetts No Drawing. Application October 27, 1938, Serial No. 237,279

6 Claims. (Cl. 260—744)

The present invention relates to adhesives and more particularly to waterproof adhesives which will retain their adhesion at low temperatures and which may be rendered non-adhesive by simple treatment after they have served their purpose as an adhesive.

In many adhesive applications it is not only desirable that the adhesive maintain its adhesiveness under the various conditions of temperature, humidity, etc. to which it may be subjected in use, but, also desirable that the adhesive bond be such that it can readily be broken if it is desired to separate the parts which it joins. Thus, an adhesive for sticking labels to beverage bottles must form an adhesive bond between the label and the glass of the bottle which will not be destroyed by immersion of the bottles in ice water while they are in the hands of the retail distributor and will persist throughout the life of the bottle as a beverage container. After the bottles have been emptied by the consumer and returned, however, it is necessary to remove the labels preparatory to refilling and relabeling the bottles. Commercial conditions require that this removal be effected with a minimum of expense and interference with the bottle washing and refilling routine.

The adhesive composition of my invention finds particular utility in connection with the labeling of beverage bottles and I shall therefore for convenience of description describe it with reference to this particular use. It is apparent, however, that the composition is useful generally where an ice and waterproof adhesive or a waterproof adhesive, which may be easily softened and removed, is desired.

An object of the invention is to provide a waterproof adhesive composition which will remain tacky and adhesive at the temperature of melting ice.

Another object of the invention is to provide a waterproof adhesive composition which may be easily softened and caused to lose its adhesiveness by simple treatment when it is desired to separate articles joined by it.

A more specific object is to provide an adhesive suitable for labeling beverage bottles which will permit the labels to be readily removed in the bottle-washing bath.

A further specific object of the invention is to provide an adhesive composition of such initial viscosity and adhesive characteristics that it will operate satisfactorily in conventional bottle-labeling machinery.

Other objects of the invention will become apparent from the following specification.

An adhesive to be satisfactory for securing labels to beverage bottles should satisfy a number of different requirements. It must first of all be adaptable to use with automatic bottle labeling machinery. Thus, it must have a sufficiently low viscosity and be sufficiently free from stringiness to permit the rapid application of a thin film to the label. The "tack" or adhesiveness of the undried low viscosity composition must be great enough to insure pulling all types of labels out of the label bed of the labeling machine. Since it is customary to store beverage bottles for extended periods of time in coolers in an ice and water mixture in which the bottles are apt to be roughly scraped against each other and the pieces of ice, it is necessary that the adhesive be capable of withstanding rough mechanical treatment under these conditions. An adhesive for use with beverage bottle labels must permit the ready removal of the labels from the empty bottles in the course of the bottle washing operations preparatory to refilling of the bottles. In general, the adhesive must be relatively stable and not susceptible to changes in composition or physical properties upon exposure to atmospheric conditions or ageing. The composition should not corrode the various parts of filling or labeling machinery with which it comes in contact and should dry quickly to the point where the labels are firmly secured to the bottles.

I have found that a satisfactory type of adhesive which possesses the above described characteristics and attains the objects of the invention comprises essentially an emulsion of an adhesive base which is insoluble in water but is soluble in dilute alkali in a solution of a waterproofing agent and an emulsifying agent which is soluble or swellable in dilute alkali, if the ratio of adhesive base to emulsifying agent is such that as the composition dries down the phases of the emulsion invert and the water soluble components become coated over with a continuous coating of the water insoluble adhesive base.

The adhesive bases which have been found satisfactory in this relation are bases made up from "broken down" rubber, a natural or synthetic resin, or gum-resin and a material which lowers the melting point of the composition. As the resin component, I, at present, prefer to use natural gum rosin although any of the natural copal, manila and senegal resins, synthetic resins of high acid number, or mixtures of these resins, which are compatible with the rubber and the melting point adjusting material, may be used.

Where it is not essential that the adhesive be rapidly strippable in dilute alkali, synthetic gum-resins of lower acid number may be used to form the adhesive base, provided they are compatible with the rubber and melting point adjusting material. Thus, ester gum and similar synthetic resins of low acid number form waterproof adhesives, in accordance with this invention, which are eminently satisfactory from the viewpoint of waterproofness and adhesion, but lack, however, the property of rapid strippability in dilute alkali.

By the term "adhesive base" as used herein I mean the adhesive base defined in the two preceding paragraphs.

In order to lower the melting point of the composition, it is desirable to incorporate a compatible low melting component in the adhesive base. I prefer to use petrolatum for this purpose. Fatty acids which are completely soluble in dilute alkali, such as oleic acid, are also satisfactory.

The adhesive base is incorporated in the composition as a solution in a mutual solvent for its components. This solvent should preferably be one of higher boiling point than water, although lower boiling solvents, such as benzol, have been used with satisfactory results. Higher boiling solvents have the advantage, among others, of remaining behind after the water is evaporated off and insuring that the emulsifying agent is properly coated over with the insoluble adhesive base. The preferred solvent is a naphtha boiling in the range 228–288° F.

The emulsifying agent must be soluble in dilute alkali and be capable of stabilizing the emulsion of the adhesive base in the aqueous phase. As the emulsifying agent casein possesses many advantages. It exhibits good emulsifying properties, producing a stable emulsion of the adhesive base in the aqueous medium and in addition increases the tackiness and cohesion of the undried composition, facilitating pick-up of the labels in automatic labeling machinery. Because of its solubility in dilute alkali this material facilitates removal of the labels in the conventional bottle washing bath by swelling in the liquid of the bath which penetrates the adhesive base and disrupting the adhesive film. It is preferable to add a relatively small proportion of methyl cellulose along with the casein to increase the initial tack of the composition.

If the composition is to possess a high degree of water resistance, it is essential that a waterproofing agent be incorporated in the aqueous phase of the composition. As the waterproofing agent, I prefer to use T. N. shellac, in relatively small proportions, because of its superior film forming characteristics and because it increases the adhesion of the composition. Other natural or synthetic resins are satisfactory in this relation provided they are weaker acids than rosin or the material used in place of rosin in the adhesive base. The waterproofing agent may be placed in solution in the aqueous phase by use of a solubilizing agent or may be suspended in this phase as a colloidal dispersion. When shellac is used as the waterproofing agent, I prefer to first dissolve it in water to which a small proportion of borax has been added. I, at present, believe that after the emulsion is formed with the adhesive base, however, some of the borax of the water phase is taken up by the resin of the adhesive base, causing the shellac to be thrown out of solution and colloidally dispersed in the aqueous phase.

To illustrate the invention more fully, the following example of an adhesive composition embodying the principles of my invention is given.

*Example*

An adhesive base is first formed by working 10 parts of "broken-down" rubber together with 30 parts of petrolatum, preferably in a Werner-Pfleiderer mixer and adding the mixture to 160 parts of molten rosin. After thorough mixing, 20 parts of special naphtha (B. P. 228–288° F.) are added and the temperature raised to about 190–200° F. The aqueous component is formed by adding to 30–35 parts of water (1) a mixture of a solution of 10 parts of casein in 54.5 parts of water and 2.5 parts of borax with a solution of 1 part of methyl cellulose in 19 parts of water, and (2) a solution of 6 parts of T. N. shellac in about 22.5 parts of water and 1.5 parts of borax. The adhesive base is then run into the mixture of other components which has been heated to about 190–200° F. The mass is thoroughly agitated during the blending process in order to form a stable emulsion. The resulting adhesive composition is suitable for use with conventional labeling machines. When used with a semi-automatic World labeler about five thousand labels of the size ordinarily used on export beer bottles may be applied per pound of adhesive.

The methyl cellulose appears to have two principal functions in the adhesive. When used in the extremely small amount indicated in the example, it acts as a stabilizing agent for the emulsion and serves to modify the viscosity or fluidity characteristics of the emulsion to increase the initial tackiness and cohesive power of the adhesive. Because of its water solubility, this material also aids in disrupting the adhesive film in the alkaline bottle washing bath. If added in excessively large amounts, however, it will have an adverse effect on the waterproofness of the adhesive.

The borax may be replaced in whole or in part by ammonia as an agent for inducing water solubility of the shellac and the casein.

It is essential that the casein be present in a proportion large enough to insure that the emulsion will remain stable during shipping and storage and while in the labeling machine. I have found that satisfactory water insoluble adhesives can be made up using ratios of casein to adhesive base ranging from approximately 1/20 to 1/60. When ratios much below 1/60 are employed, the adhesive is not sufficiently stable. Thus, at a ratio of casein to adhesive base of 1/80 the stability has decreased to the extent that 15 minutes use on the labeling machine will invert the phases of the emulsion.

To soften and dissolve set and dried films of the adhesive, it is merely necessary to expose them to a slightly alkaline aqueous medium. The thin films of adhesive base which coat the casein and cellulosic particles are quickly dissolved permitting the water to attack the casein and methyl cellulose particles and cause them to swell and disrupt the structure of the film. This dissolving and swelling action is, of course, more rapid at higher temperatures and, accordingly, it is generally expedient to use baths of warm water for this purpose. It has been found that labels of beverage bottles secured by this adhesive come off readily in a conventional 5% caustic bottle washing bath at 60° C.

Adhesive compositions in accordance with this invention, in which the resin of the adhesive base is a resin of low acid number and which, consequently, are not strippable in dilute alkali, have been found satisfactory for use in forming spiral or convolute wound containers of fibrous material, such as paper, in which a high degree of waterproofness is desired. These non-strippable adhesives are also useful as lap pastes for use on cans which are apt to be subjected to sweating conditions where the standard starch and dextrine paste would loosen up.

Since it is obvious that various changes may be made in the specific details set forth above by one skilled in the art, it is understood that the invention is not limited thereto, but includes all modifications falling within the scope of the following claims.

I claim:

1. An adhesive composition sufficiently stable to permit shipment and storage and adapted upon drying to form a water-resistant adhesive film comprising an emulsion the disperse phase of which contains approximately 10 parts of broken-down rubber and 160 parts of a resin selected from the class consisting of rosin, copal, manila and senegal dissolved in a mutual water-immiscible organic solvent for the rubber and resin and the continuous phase of which comprises an alkaline aqueous solution of approximately 6 parts of a second resin of lower acid number than the first mentioned resin and 10 to 30 parts of casein.

2. The process of producing a non-stratified water-resistant adhesive film which will soften and disintegrate in dilute alkali which comprises making an emulsion the disperse phase of which contains approximately 10 parts of broken-down rubber and 160 parts of a resin selected from the class consisting of rosin, copal, manila, and senegal dissolved in a mutual water-immiscible organic solvent and the continuous phase of which includes an alkaline aqueous solution of approximately 6 parts of shellac and 10 to 30 parts of casein, forming the emulsion into a film and bringing about an inversion of the phases of the emulsion by removal of liquid.

3. The process of producing a non-stratified water-resistant adhesive film which will soften and disintegrate in dilute alkali which comprises making an emulsion the disperse phase of which contains approximately 10 parts of broken-down rubber, 160 parts of a resin selected from the class consisting of rosin, copal, manila, and senegal and 20 parts of a mutual water-immiscible organic solvent for the other components of the disperse phase and the continuous phase of which includes an alkaline aqueous solution of approximately 6 parts of shellac and 10 to 30 parts of casein in approximately 130 parts of water, forming the emulsion into a film and causing an inversion of the phases of the emulsion by removal of liquid.

4. An adhesive composition sufficiently stable to permit shipment and storage and adapted upon drying to form a water-resistant adhesive film comprising an emulsion the disperse phase of which contains approximately 10 parts of broken-down rubber, 160 parts of a resin selected from the class consisting of rosin, copal, manila and senegal and 20 parts of a mutual water-immiscible organic solvent for the other components of the disperse phase and the continuous phase of which includes an alkaline aqueous solution of approximately 6 parts of shellac and 10 to 30 parts of casein in approximately 130 parts of water.

5. An adhesive composition sufficiently stable to permit shipment and storage and adapted upon drying to form a water-resistant adhesive film comprising an emulsion the disperse phase of which contains approximately 10 parts of broken-down rubber, 30 parts of petrolatum, 160 parts of rosin and 20 parts of naphtha and the continuous phase of which includes approximately 130 parts of water, 10 parts of casein, 4 parts of borax and 6 parts of shellac.

6. An adhesive composition sufficiently stable to permit shipment and storage and adapted upon drying to form a water-resistant adhesive film comprising an emulsion the disperse phase of which contains approximately 10 parts of broken-down rubber, 160 parts of a resin selected from the class consisting of rosin, copal, manila and senegal and 20 parts of a mutual water-immiscible organic solvent for the rubber and resin and the continuous phase of which is an alkaline aqueous solution of approximately 10 to 30 parts of a water-insoluble emulsifying agent which is soluble in dilute alkali and 6 parts of shellac in approximately 130 parts of water.

JACOB G. MARK.